United States Patent [19]

Harvey et al.

[11] Patent Number: 4,627,069
[45] Date of Patent: Dec. 2, 1986

[54] JOULE MELTER FOR THE PROCESSING OF RADIOACTIVE WASTES

[75] Inventors: Keith B. Harvey; Cynthia D. Litke, both of Pinawa; Robert J. Porth, Seven Sisters Falls, all of Canada

[73] Assignee: Atomic Energy of Canada Limited, Ottawa, Canada

[21] Appl. No.: 613,335

[22] Filed: May 23, 1984

[30] Foreign Application Priority Data

Jun. 17, 1983 [CA] Canada .................................. 431769

[51] Int. Cl.$^4$ ............................................ C03B 5/027
[52] U.S. Cl. ........................................ 373/29; 373/30; 373/35; 373/33
[58] Field of Search ....................... 373/27, 29, 30, 31, 373/32, 33, 36, 38, 35; 252/629, 628; 65/325, 326, 327

[56] References Cited

U.S. PATENT DOCUMENTS

| | | |
|---|---|---|
| 2,268,546 | 1/1942 | Forter . |
| 2,482,299 | 9/1949 | Stevens ............................. 373/31 X |
| 2,658,096 | 11/1953 | Peyches ................................ 373/29 |
| 2,749,379 | 6/1956 | Geffcken et al. .................. 373/38 X |
| 2,781,411 | 2/1957 | Geffcken et al. . |
| 3,519,412 | 7/1970 | Olink . |
| 3,876,817 | 4/1975 | de Bussy . |
| 3,912,488 | 10/1975 | Sanford et al. . |
| 4,139,360 | 2/1979 | Piper . |

OTHER PUBLICATIONS

Liquid-Fed Ceramic Melter; Buelt et al, Oct. 1978, doc. No. PNL-2735, UC-70, U.S. Dept. of Energy.

Primary Examiner—Roy N. Envall, Jr.
Attorney, Agent, or Firm—Edward Rymek

[57] ABSTRACT

The joule melter has an outer cylindrical electrode which forms the outer wall of the melt containment, an inner cylindrical electrode which protrudes upward in the containment and forms the outlet for the melt, thus, also determining the depth of the melt. A non-conducting sealing material forms a base plug between the electrodes. A cylindrical electrically conductive baffle is located between the electrodes and includes an opening which allows the melt to flow from near the outer electrode where the melt material is first inserted into the melter, to the inner electrode which is the outlet. In addition to the inner and outer electrodes, the baffle may be connected to a power supply to modify the currents flowing at each of the electrodes.

8 Claims, 2 Drawing Figures

JOULE MELTER FOR THE PROCESSING OF RADIOACTIVE WASTES

BACKGROUND OF THE INVENTION

This invention is directed to joule melters for glass and, in particular, to joule melters in which radioactive wastes are mixed with the molten glass for disposal.

Among the many approaches to the immobilization of radioactive fission products and actinides derived from the reprocessing of nuclear fuels, one promising technique consists of incorporating them into a durable glass. A Liquid-Fed Ceramic Melter technique is described by J. L. Buelt and C. C. Chapman in a report prepared for the United States Department of Energy in October 1978—document number PNL-2735, UC-70. In this report, as well as in U.S. Pat. No. 4,139,360 which issued on Feb. 13, 1979 with Helmut Piper as inventor, joule melters used in the immobilization of radioactive waste are described.

Molten glass is a conductor of electricity and, as the temperature of the glass rises, its electrical resistance decreases. A joule melter is designed to pass an electric current through the glass, producing heat according to the square of the current and the first power of the resistance. In the form developed for solidification of reprocessing wastes, a joule melter consists of a rectangular or polygonal box, with an inner surface of a corrosion-resistant refractory, an intermediate layer of heat-insulating refractory, and an outer metal containment. Current is passed through the glass from two or more electrodes placed on or in opposite faces of the box. Molten glass is withdrawn from the melter by means of an outlet spout, while fresh, unmelted material is introduced on the top of the melt. A usual refinement is a baffle, also of corrosion-resistant refractory, to prevent unmelted material from moving directly to the outlet.

Because it is possible to pass an appreciable current through a glass only when it is molten, it is necessary to provide startup heaters to raise the glass to a sufficient temperature for the joule-heating effect to be used. The startup heaters are normally radiant heaters installed in the space above the melt. Auxiliary heaters are often placed at the outlet to ensure a proper glass flow from the melter.

In addition to the above joule melters which have been designed as part of a radioactive waste disposal technique, many other types of glass furnaces have been used for making an purifying glass or ceramic products. For instance, U.S. Pat. No. 2,268,546 which issued on Jan. 6, 1942, is an example of a fuel fired furnace in which molten glass leaves the melting chamber through a central overflow tube. U.S. Pat. No. 3,147,328 which issued on Sept. 1, 1964, U.S. Pat. No. 3,519,412 which issued on July 7, 1970, U.S. Pat. No. 3,876,817 which issued on Apr. 8, 1975, and U.S. Pat. No. 3,912,488 which issued on Oct. 14, 1975, on the other hand, are all examples of joule melters with their molten glass outlet at the center of the melting chamber, but which have quite different electrode arrangements. Finally, U.S. Pat. No. 2,781,411 which issued on Feb. 12, 1957, describes a melter with concentric electrodes to be used for purifying glass.

Though the process of joule melting has been applied to the manufacture of radioactive glasses with some success, it has been found that in many cases the prime limitation on the working life of the joule melter has been due to the corrosion of the refractory. Though the life of a melter may be extended somewhat, the problem of disposing of an apparatus which itself becomes radioactive with time, is inevitable. The dismantling and disposal of all of the prior art devices have been found to be very difficult since they are complex and bulky.

SUMMARY OF THE INVENTION

It is therefore an object of this invention to provide a joule melter particularly applicable to the disposal of radioactive wastes.

It is a further object of this invention to provide a joule melter which is convenient to dismantle and dispose.

These and other objects are achieved in a joule melter comprising inner and outer concentric electrodes adapted to be connected to a power supply, with the outer electrode forming an outer melt containment having a predetermined depth, and the inner electrode forming an outlet for the melt.

A non-conducting sealing material between the inner and outer electrodes forms a base plug for the containment. Insulating refractory material encloses the containment to limit its heat loss. A conductive baffle which may also be adapted for connection to a power supply is located between the inner and outer electrodes and is concentric therewith. The baffle has an opening below the surface of the melt to allow the melt to move freely.

In accordance with another aspect of the invention, the inner and outer electrodes and the baffle are cylindrical. In addition, the inner electrode protrudes into the containment and determines the depth of the melt.

The joule melter further includes a first inlet for receiving melt materials as well as a further inlet for receiving liquid radioactive waste, both between the outer electrode and the baffle.

In another aspect of this invention, heaters are positioned between the insulating refractory material and the outer electrode to provide initial heat to the containment.

Many other objects and aspects of the invention will be clear from the detailed description of the drawings.

DETAILED DESCRIPTION

Figure 1:
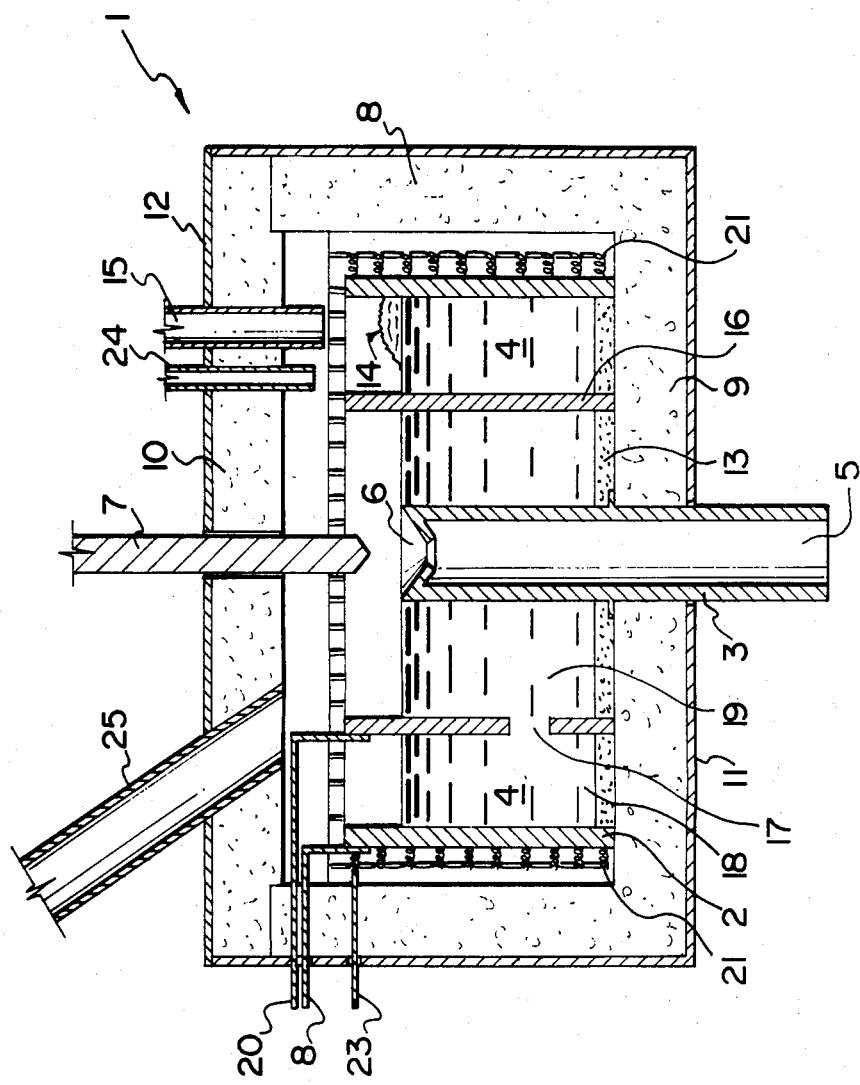
FIG. 1 is a cross-sectional view of the joule melter in accordance with the present invention.
Figure 2:
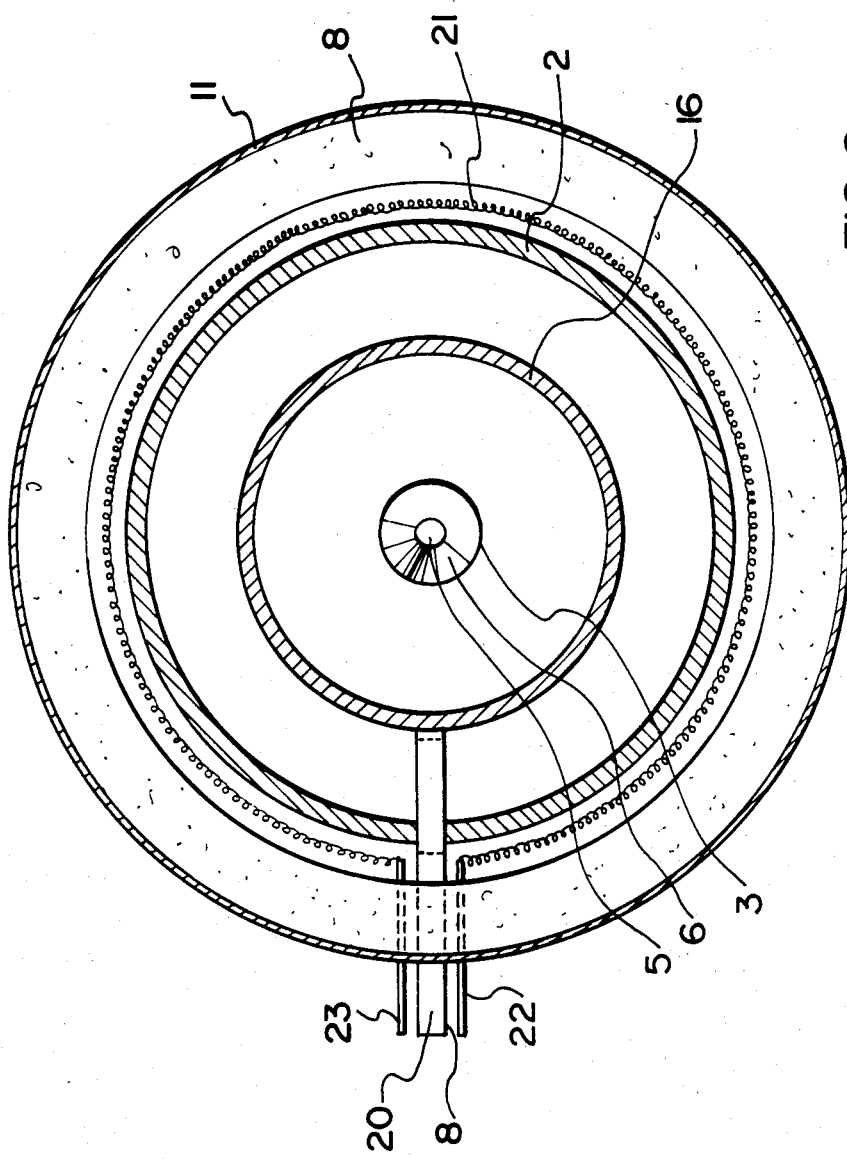
FIG. 2 is a top view of the joule melter with the cover removed.

The joule melter in accordance with the present invention is described with respect to FIGS. 1 and 2. The joule melter 1 includes a pair of concentric electrodes 2 and 3. Electrode 2 forms the outer walls of the containment for the glass 4. Electrode 3 which is positioned within electrode 2, is hollow in order to form the outlet 5 for the molten glass 4. Electrode 2 therefore rises above electrode 3 within the melter 1, however electrode 3 protrudes below the melter 1 where a disposal container may be placed to receive the molten glass 4 that is mixed with the radioactive waste. The outer electrode 2 and inner electrode 3 may be of any general shape, however, it has been determined that if they are both cylindrical, the melting process will be better and more even since the distance between the electrodes 2 and 3 is constant. When used for waste disposal, it is preferred that outer electrode 2 have a maximum diameter that is less than 50-60 cm, which is the diameter of waste disposal containers. For other applications, its diameter may be up to 1 meter. The inner electrode 3 may have a diameter up to ⅓ the diameter of the outer electrode 2, and be nearly equal in height. It is also to be noted that the density of the current near the inner electrode 3 will be much higher than at electrode 2, which produces greater heating at electrode 3. This is counterbalanced somewhat since the resistance of glass decreases with temperature producing relatively lower power dissipation near electrode 3. Electrodes 2 and 3 are preferably made from Inconel R 690 since this metal is highly conductive, it is heat-resisting and is also highly resistive to corrosion from the molten glass 4. Under certain conditions however, either other materials may be used or a cooling arrangement may be incorporated into the electrodes. For example, if it is necessary to melt glasses at very high temperatures, such as above 1400° C., molybdenum may be used. Alternately, at least electrode 2 may be water cooled.

The top of inner electrode 3 may be shaped in the form of a reentrant cone 6 to facilitate the flow of molten glass 4 and thus form the outlet 5. This also allows the use of a plunger 7 in cone 6 to prevent flow, if so desired. Plunger 7 will preferably be made from the same material as electrodes 2 and 3 to prevent corrosion and to allow current flow between the plunger 7 and electrode 3 if it becomes necessary to free the plunger 7 from the electrode 3. The outer electrode 2 is connected to a power supply by a lead 8 while inner electrode 3 is connected to ground.

In order to contain the heat, the vessel formed by the electrodes 2, 3 is enclosed by an insulating refractory material, such as alumino-silicate bricks which are cut or shaped for this purpose, to form the walls 8, the base 9 and the cover 10 for the joule melter 1. The thickness of this refractory material will be between 10 and 25 cm. To provide strength and rigidity to the melter 1, the entire melter is enclosed in a low grade stainless steel casing 11. In addition, a durable cover 12 is provided to protect the refractory material 10.

The bottom of the melter 1 is sealed by a plug 13 that consists of a tamped layer of material that is either similar in composition to that which is being melted, or is such that it will react with the material being melted to form a material of higher melting point. In the case of melting borosilicate glasses, a mixture of 80 wt.% calcined alumina and 20 wt.% kaolin has been found satisfactory, particularly when the alumina mixture is used. However, when the plug 13 consists essentially of powdered glass material, it is preferable to cool the plug 13 such that it does not melt and will thus protect the insulating refractory material 9.

The melter 1 is charged with glass material 14 through an inlet 15 which passes through the cover 10 near the outer electrode 2. Various types of glass materials can be used, however the glass products presently preferred for waste disposal purposes are: borosilicate glasses, aluminosilicate glasses, titanosilicate glasses, or a combination of these. In some quarters, phosphate glasses are also being used. Other glasses which are not used for waste disposal purposes can also be produced in the melter 1 since their melt temperatures are very similar. Borosilicate and phosphate glasses normally have melting points in the range of 1050°-1250° C., while the aluminosilicates and titanosilicates normally have melting points in the range of 1250°-1600° C.

Table 1 below provides typical glass composition ranges in wt.% for the above glasses.

In order to keep the new material 14 from moving directly to the outlet 5, a baffle 16 concentric with electrodes 2 and 3 is positioned between electrodes 2 and 3. This baffle 16 has an opening 17 near the bottom through which glass material 4 from the outer annulus 18 can move into the inner annulus 19 toward electrode 3. The spacing between the baffle 16 and the inner and outer electrodes is not critical except to provide sufficient space in the outer annulus for the new material 14. The opening 17 in the baffle 16 should be of sufficient size to provide free flow and should be about ⅓ of the way up from the bottom to eliminate dead areas as much as possible and at the same time to be sure that the opening does not become blocked. Baffle 16 is made from the same materials as electrodes 2 and 3, such as Inconel R 690, and generally acts as a floating electrode. A non-conducting baffle 16 would cause the electric field between electrodes 2 and 3 to be highly non-symmetrical. In addition, the baffle 16 may be used to provide different total currents in each of the annuli 18 or 19, by the voltages applied between electrode 2 and baffle 16, and between baffle 16 and electrode 3.

TABLE 1

| | Typical Glass Composition Ranges in wt. % | | | |
|---|---|---|---|---|
| | Borosilicate | Aluminosilicate | Titanosilicate | Phosphate |
| $Na_2O$ | 8-13 | 12-19 | 4-8 | 25-30 |
| CaO | 2-27 | 0-28 | 12-16 | |
| $B_2O_3$ | 9-13 | | | |
| $Al_2O_3$ | | 14-24 | 5-11 | 26-41 |
| $SiO_2$ | 27-40 | 33-56 | 50-54 | |
| $TiO_2$ | | | 15-20 | |
| $P_2O_5$ | | | | 33-49 |

A lead 20 connected to baffle 16 is provided for this purpose. In this way, the temperature of the inner annulus 19 melt 4 may be increased to obtain rapid flow through outlet 5. Conversely, the current in the outer annulus 18 may be increased to obtain rapid melting of the new material 14, or to equalize the current densities in the inner and outer annuli 18, 19.

Since glass in its solid state is highly non-conductive, start-up heaters 21 are provided around the periphery of the melter 1 between the outer electrode 2 and the insulating refractory walls 8 in order to provide the initial heat to the glass material 14 to initiate the melt. These heaters are powered through leads 22 and 23.

High level waste is normally in the form of a liquid which can be dried and calcined, and then mixed with the glass material that is loaded into the melter 1. However, in the melter 1 the liquid waste can be added directly to the melter 1 through an inlet 24. The liquid will vaporize and the radioactive solids will melt with the glass material 14. The off-gases exit from the melter 1 through a large diameter pipe 25 which leads to an off-gas unit where the gases are passed through first filters which catch any particles such as zenon or krypton, and further filters such as zeolite filters which absorb the gases.

The melter 1 in accordance with the present invention provides many advantages over prior devices used in radioactive waste disposal. The life of the melter 1 is longer since there is no direct contact between the molten glass 4 and waste, and the refractory material 8 or 9. The bulk of the melter 1 is reduced since the space above the melt 4 is reduced. The melter 1 is convenient to dismantle since the melt containing vessel, defined by electrode 2 can easily be removed and disposed of in regular disposal cannisters. In addition, the entire joule melter 1, which is also cylindrical, is the proper shape for easy disposal, if necessary.

Many modifications in the above described embodiments of the invention can be carried out without departing from the scope thereof and, therefore, the scope of the present invention is intended to be limited only by the appended claims.

We claim:

1. A joule melter for glass related products comprising:
    inner and outer concentric electrodes adapted to be connected to a power supply, the outer electrode forming an outer wall of the melt chamber having a predetermined depth to contain the melt, the inner electrode being hollow to form an outlet for the melt;
    non-conducting seal means between the inner and outer electrodes to form a base plug for the melt chamber; and
    insulating refractory material enclosing the melt chamber.

2. A joule melter as claimed in claim 1 which further includes conductive baffle means located between the inner and outer electrodes and concentric therewith, the baffle means having an opening below the melt depth level.

3. A joule melter as claimed in claim 2 which further includes inlet means for receiving melt materials between the outer electrode and the baffle means.

4. A joule melter as claimed in claim 3 wherein the inner electrode, outer electrode and baffle means are cylindrical.

5. A joule melter as claimed in claim 4 wherein the inner electrode protrudes into the melt chamber to determine the depth of the melt.

6. A joule melter as claimed in claim 5 which includes further inlet means for receiving liquid radioactive waste between the outer electrode and the baffle means.

7. A joule melter as claimed in claim 6 which includes heater means positioned between the insulating refractory material and the outer electrode to provide initial heat to the melt chamber.

8. A joule melter as claimed in claim 7 wherein the baffle means includes a lead for connection to a power supply.

* * * * *